United States Patent [19]
Nutter et al.

[11] Patent Number: 5,975,504
[45] Date of Patent: Nov. 2, 1999

[54] CLOSELY-SPACED HIGH CAPACITY FRACTIONATION TRAYS

[75] Inventors: Dale E. Nutter, Tulsa, Okla.; Michael R. Resetarits, De Pew, N.Y.; Daniel R. Monkelbaan, Amherst, N.Y.; Nicholas F. Urbanski, De Pew, N.Y.

[73] Assignee: UOP LLC, Des Plaines, Ill.

[21] Appl. No.: 09/038,554

[22] Filed: Mar. 11, 1998

Related U.S. Application Data

[60] Provisional application No. 60/040,530, Mar. 12, 1997.

[51] Int. Cl.⁶ .................................................. B01F 3/04
[52] U.S. Cl. .................................... 261/114.3; 261/114.5
[58] Field of Search ............................ 261/114.1, 114.3, 261/114.4, 114.5

[56] References Cited

U.S. PATENT DOCUMENTS

| | | | |
|---|---|---|---|
| 3,410,050 | 11/1968 | Bruckert | 261/113 |
| 3,463,464 | 8/1969 | Nutter et al. | 261/114 |
| 3,747,905 | 7/1973 | Nutter | 261/114.3 |
| 5,360,583 | 11/1994 | Nutter | 261/114.3 |
| 5,382,390 | 1/1995 | Resetarits et al. | 261/114.3 |
| 5,468,425 | 11/1995 | Nutter | 261/114.3 |
| 5,547,617 | 8/1996 | Lee et al. | 261/114.5 |
| 5,788,894 | 8/1998 | Yeoman et al. | 261/114.3 |

FOREIGN PATENT DOCUMENTS

| | | | |
|---|---|---|---|
| 0001448 | 4/1979 | European Pat. Off. | 261/114.3 |
| 1375269 | 2/1988 | U.S.S.R. | 261/114.5 |

OTHER PUBLICATIONS

Advertisement, *Chemical Engineering Progress*, Dec. 1996, vol. 92, No. 12, p. 1.

*Primary Examiner*—C. Scott Bushey
*Attorney, Agent, or Firm*—Thomas K. McBride; John F. Spears, Jr.

[57] ABSTRACT

High vapor and liquid capacity counterflow fractionation trays demonstrating superior turndown and performance characteristics include a number of parallel downcomers separated by planar tray decking having unique bidirectional slotted cap valve geometries. Several different arrangements of the bidirectional valves are presented. The raised trapezoids of the bidirectional valves may be arranged in two groups which each face the nearest downcomer, or arranged in lines parallel to the downcomer sidewalls such that trapezoids of neighboring rows face opposite directions. In a third embodiment these bidirectional slotted cap valves are only located in the regions of the decking sections located next to the downcomers.

7 Claims, 8 Drawing Sheets

20-in x 46-in AIR-WATER COLUMN
DATA @ 12-in TRAY SPACING
0.0667 ft$^3$/s.ft weir 20-in x 46-in AIR-WATER COLUMN
DATA @ 12-in TRAY SPACING
0.1003 ft$^3$/s.ft weir

CLOSELY-SPACED HIGH CAPACITY FRACTIONATION TRAYS

CROSS REFERENCE TO RELATED APPLICATION

This application claims benefit of the filing date of provisional application Ser. No. 60/040,530 filed Mar. 12, 1997.

FIELD OF THE INVENTION

The invention relates to gas-liquid contacting apparatus intended primarily for use as a fractionation tray in a fractional distillation column used for the separation of volatile chemical compounds.

RELATED ART

U.S. Pat. No. 3,410,050 issued to W. Bruckert illustrates the basic structural components of a multiple downcomer tray, which is characterized by the provision of a number of relatively narrow downcomers separated by decking and spread across the entire surface of the tray. This patent also illustrates several optional mechanical arrangements for the bottom of the downcomer.

U.S. Pat. No. 3,463,464 issued to I. E. Nutter illustrates a cross flow fractionation tray characterized by the unique shape of the perforations in the tray decking through which the vapor passes.

U.S. Pat. No. 5,382,390 issued to M. R. Resetarits et al. illustrates the structure of the elongated narrow downcomers of the present tray. It also describes the use of vapor directing slots on the tray decking, with these slots being aligned in opposing directions set by their location on the tray decking.

U.S. Pat. Nos. 5,360,583 and 5,468,425 issued to D. E. Nutter illustrate a suitable structure for the trapezoidal perforations or apertures in the tray decking of the subject tray.

U.S. Pat. No. 5,547,617 issued to A. T. Lee et al., illustrates a large number of mechanical variations in the structure of multiple downcomer fractional distillation trays. FIGS. 2, 3 and 5 show the use of parallel trough-like downcomers. FIGS. 6, 8 and 9 show alternative arrangements in which the directional flow valves 322, face different directions at the periphery of the tray.

The use of capped or raised bidirectional vapor passage apertures having perpendicular alignments on a single tray decking plate is illustrated in an advertisement which appeared at page 1 of the December 1996 edition of *Chemical Engineering Progress*, Vol. 92, No. 12.

BRIEF SUMMARY OF THE INVENTION

The subject invention is a high capacity fractionation tray comprised of a number of long narrow downcomers with intervening bands of tray decking having novel locations and orientations of bidirectional cap-like vapor valves. The orientations of the valves, as defined by the geometry of a raised trapezoid, is dependent on the location of the nearest downcomer. In an alternative embodiment the tray decking contains both monodirectional slotted caps and bidirectional vapor valves in unique arrangements on the surface of the decking. This provides a high capacity gas-liquid contacting apparatus possessing good efficiency, low liquid entrainment and good turn-down characteristics which is very suitable for use at low tray spacing.

One preferred embodiment of the invention may be characterized as a fractionation tray adapted for being mounted in a horizontal plane in a vertical fractionation column, said tray having upper and lower surfaces and comprising a plurality of trough-like downcomers, with each downcomer comprising a pair of sidewalls, each of said downcomers having liquid sealable openings located in a lower region thereof; and, substantially planar decking plates occupying the remainder of the tray surface including a rectangular area located between said downcomers, with the decking plates of the tray having perforations suitable for the upward passage of the entire upward vapor flow in the column, with at least a major portion of these perforations being formed in the decking plates of the tray by a pressing operation which forms bidirectional slotted caps raised above the planar upper surface of the decking plates, each of said bidirectional slotted caps being a trapezoid portion of the decking plate material having two sides and two ends, one end being narrower than the other end, with said trapezoid portion substantially covering an opening formed by the pressing operation to provide oppositely directed vapor outlet slots at the sides thereof, and with the decking plates being further characterized by the orientation of bidirectional slotted caps in a pattern in which groups of the bidirectional slotted caps face in opposite directions.

DETAILED DESCRIPTION AND PREFERRED EMBODIMENTS

Figure 1:
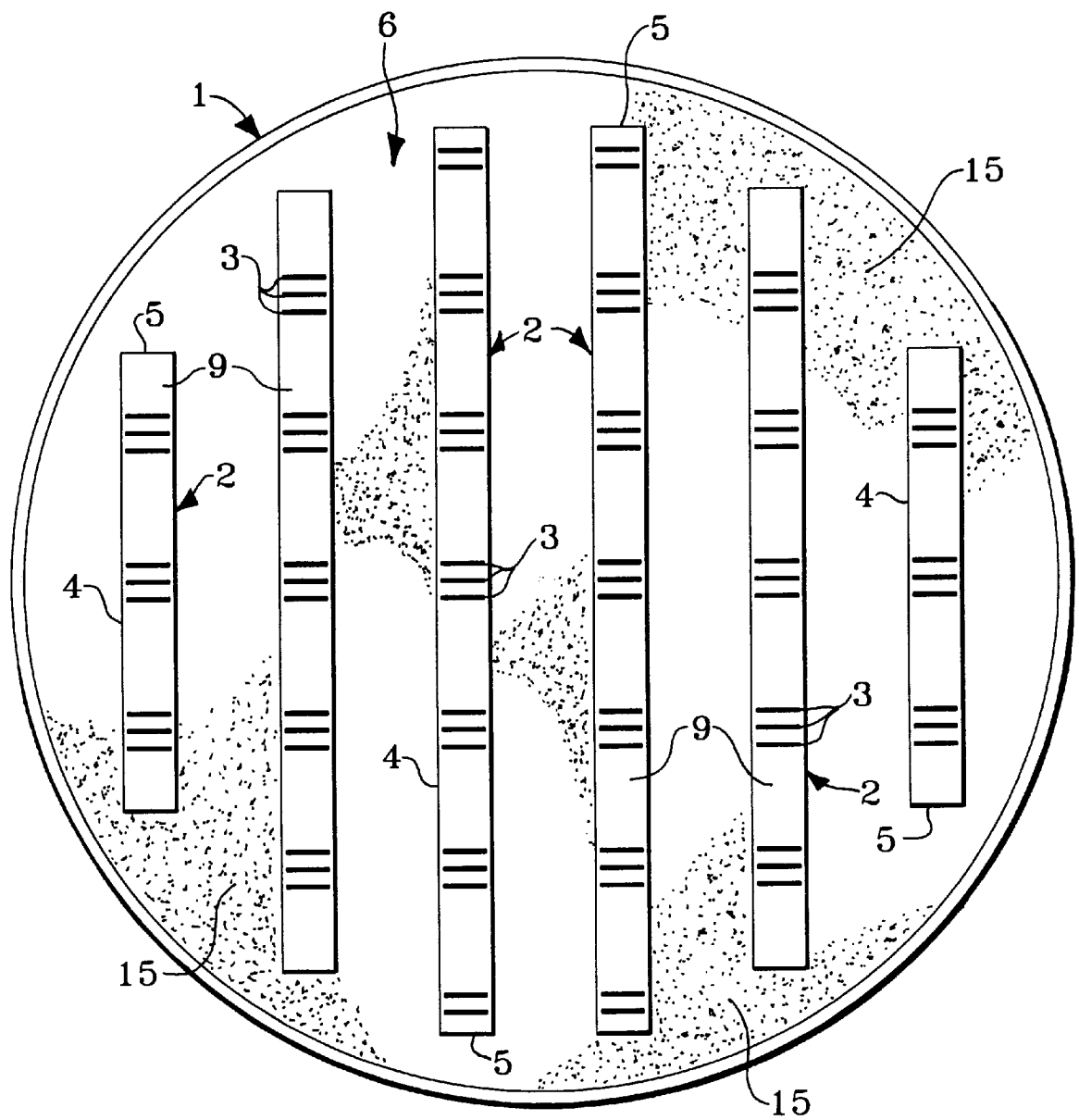
FIG. 1 is an overhead view of one embodiment of multiple downcomer fractionation tray 6 showing a plurality of parallel downcomers 2 and perforated decking 15 surrounded by the cylindrical wall 1 of the fractionation column.

Fractionation trays find utility in separating a wide variety of chemicals including hydrocarbons, alcohols, ethers and other compounds in petroleum refineries, petrochemical units and chemical manufacturing plants. As with any useful industrial equipment, there are constant demands to improve the performance and lower the cost of the equipment. Several different types of trays, each having its own advantages and disadvantages have been developed. A simple pictorial depiction of several different types of trays; e.g. sieve trays, dual flow trays and Turbogrid trays is provided at pages 3–4 of *Distillation Tray Fundamentals*, by M. J. Lockett published by Cambridge University Press, 1986.

In a fractional distillation column, a multicomponent feed stream is separated into an overhead vapor stream comprising a more volatile chemical compound removed overhead and a bottoms liquid stream comprising a less volatile compound. That is, the compounds entering the column are separated therein with the more volatile compound(s) being carried upward through the column by an ascending vapor stream. The vapor stream passes through the trays and eventually exits the column as an overhead vapor. A portion of the condensate derived from the overhead vapor is normally returned as liquid-phase reflux. The less volatile component(s) of the feed are concentrated into the descending liquid-phase stream and eventually removed from the bottom of the column. Heat and vapor are supplied to the bottom of the column by a reboiler as by vaporizing a portion of the bottoms liquid and returning it to the column.

Fractionation trays are employed within the column as a means of promoting vapor-liquid contacting and froth formation which leads to the exchange of compounds between the vapor and liquid phases based upon their relative volatility. The trays are spaced at uniform vertical distances referred to as the tray spacing. The trays have separate areas devoted to the upward passage of vapor, which are normally referred to as the "decking" of the tray, and other areas which collect the froth. The froth is allowed to deaerate releasing "clear liquid" which descends to the next lower tray through a part of the tray referred to as a downcomer. Due to the high economic impact of column cost and the importance of good separations, which is required in most refining and petrochemical processes, there has been much development in the area of fractionation tray design.

A specific type of tray is the multiple downcomer tray shown in the previously cited U.S. Pat. Nos. 5,318,732 and 5,382,390. This tray is also described in an article appearing at page 72 of the Apr. 3, 1978 edition of *The Oil and Gas Journal*. This article includes a figure showing the basic characteristics of a multiple downcomer tray including a plurality of long, parallel trough-like downcomers evenly spaced across the surface of the tray, with bands of planar decking located therebetween. The preferred grouping of the liquid sealable outlets in the bottom of the downcomers and the traverse or perpendicular alignment of the downcomers on vertically adjacent downcomers is also shown. These trays have several advantages including great flexibility in operation and mechanical height, very good capacity which allows their use in debottlenecking existing columns, the ability to function at relatively small vertical tray spacings, and the ability to handle high liquid loads due to a high ratio of downcomer inlet length to deck area. However, as with any tray there is always a desire to increase performance. It is an objective of the subject invention to provide a multiple downcomer tray having improved performance in terms of reduced entrainment, increased rangeability and greater efficiency. It is another objective to provide a multiple downcomer tray which can be used at even closer vertical tray spacings.

These objectives are achieved through an improvement in the decking portion of the tray. This improvement relates both to the use of a bidirectional vapor flow valve structure and to novel arrangements/orientations of these unique cap-like structures on the tray decking. In another embodiment of the invention these novel deployments of the bidirectional vapor flow valves are augmented by the addition of unidirectional vapor flow-directing slots to the central band of deck area located intermediate parallel downcomers. The unidirectional vapor flow directing slots are aligned to push froth to the nearest downcomer, while the bidirectional vapor flow valves are used to increase contacting efficiency and provide a calming effect at the downcomer inlet.

The fundamental nature of the subject trays results in the tray having an unusually large ratio of available downcomer inlet length to deck area. This is due at least in part from the large absolute length of the downcomer inlets. Another factor is the relatively narrow spacing between the downcomers. This narrow downcomer spacing means liquid only needs to travel a much shorter distance as compared to a cross-flow tray having downcomers on two opposing sides of the tray. The short distance which liquid falling upon the deck must travel to reach a downcomer would logically imply that vapor and/or liquid flow-directing slots on the decking would not be needed and would have minimal if any effect on the performance of the tray. It must also be noted that such slots are normally employed only on the periphery of trays on the crescent-shaped terminal portions of a tray to combat stagnant flow conditions.

It is therefore quite surprising that the presence, type or orientation of the subject bidirectional valves on the narrow decking areas can have significant positive effects on the performance of multiple downcomer trays, including increased tray capacity and available turndown ratio.

The subject apparatus is used in fractionation columns to perform a desired separation between more and less volatile components of a feed stream. In these columns there is a general upward flow of vapor and a countercurrent sigmoidal but generally downward flow of liquid. The vapor and liquid are brought into contact on the horizontal "active area" of each tray deck as defined by the location of perforations for upward vapor flow through the tray. In a multiple downcomer tray the perforated or deck area is equal to essentially all of the tray's surface area except for that directed to the downcomers. Liquid descends through the column and is collected on each tray in the valley of the downcomer, with the liquid exiting the downcomers via the perforations in the lower portion of the downcomer structure. The composition of the vapor and liquid phases changes as they flow through the column.

Multiple downcomer trays were described above in terms of some of their physical components. Another characteristic of multiple downcomer trays is that they do not have a "receiving pan". A receiving pan is an imperforate horizontal area of a tray located below a downcomer and upon which the liquid descending through the downcomer of a cross-flow tray impacts before passing horizontally onto the active decking of the tray. This imperforate area reduces the surface area of the tray available as active area for vapor-liquid contacting. The receiving pan may be separated from the active decking area of the tray by an inlet weir. On conventional cross-flow trays receiving pans are located directly below the downcomer leading from the next above fractionation tray. The surface area of the subject fractionation tray is formed entirely of downcomers and decking. There are no large imperforate areas allocated to receiving descending liquid from the tray located immediately above.

Another distinguishing feature of the subject fractionation trays is the provision of liquid sealable outlet means in the bottom region of the downcomer module to retard vapor passage. The term "liquid sealable" is intended to indicate that when in use there is sufficient retained liquid in the downcomer and/or passing through the outlet(s) to prevent the upward passage of vapor, during normal operation, through the outlets. That is, the liquid outlets are sealed to vapor flow. As compared to drain holes for use in decommissioning the tower, these outlets are sized to accommodate the entire downward liquid flow in the column during its use. This liquid sealable outlet means is located well above the deck of the tray located immediately below. The descending liquid is collected in the lower portion of the downcomer module and spills forth upon the next lower tray through the liquid sealable openings in the side of the downcomer module base plate, sidewalls or other openings provided for this purpose.

Referring now to the drawings, FIG. 1 is an overhead view showing the arrangement of basic tray components which is common to all of the embodiments of the subject tray. The subject tray is a discoid device which is assembled by bolting together many smaller prefabricated pieces. The resultant apparatus has a circular outer perimeter adapted to be supported on a ring which is fastened to the interior surface of the cylindrical wall 1 of the fractionation column. Various horizontal beams and supports not shown can be employed to support the weight of the tray plus the weight of the liquid which rests upon the tray. However, it is preferred the tray is self-supporting; that is, that the elements of the tray preferably provide sufficient mechanical strength and stiffness that such supports are not required. The tray is generally fabricated from light gauge metal having a thickness of about 1/10th of an inch, and proper design of the tray will normally allow it to maintain a rigid shape and function satisfactorily without extensive horizontal bracing.

In the subject trays, as shown in FIG. 1, the large trough-like downcomers 2 extend across the entire tray and are designed as support elements for the rest of the tray. The vertical downcomer sidewalls 4 and the horizontal bottom plate 9 of the downcomer together with optional internal bracing within the downcomer (not shown) allow the construction of a very rigid box-like shape which extends across the tray and terminates at the downcomer endwalls 5. The endwalls are in close proximity to the support ring not shown in the drawing. The overall tray 6 comprises at least one of these trough-like downcomers and would normally comprise a plurality of parallel downcomers arranged in a manner as shown in the drawing. Surrounding the downcomers is the active perforated decking 15 of the tray. In the subject invention, the decking area contains one or two types of cap-like vapor passageways formed by a punching operation in which a portion of the sheet metal forming the deck area is bent beyond the surface of the sheet metal and one or two slots are cut into the deck material. This forms the actual opening(s) through which vapor passes from below the tray to above the tray.

In operation, liquid is descending downward through the fractionation column, with the entire liquid flow descending downward through combined openings 3 provided in the downcomers from one tray to another. At the same time, vapor is passing upward in an overall countercurrent manner, with the vapor passing entirely through the openings provided in the decking 15. This description of the fluid flow is the optimum scenario. In reality some small percentage of the liquid will leak through various areas in the tray such as the vapor passageways or joints, with this liquid bypassing being referred to as leakage or weeping. As this liquid may not have come to a full equilibrium by the vapor-liquid contacting occurring on the tray, its downward passage reduces the efficiency of the tray and is undesirable. Proper operation and design of the tray is also required to prevent the upward vapor flow from bypassing the intended vapor-liquid contacting area, as by rising through the openings 3 provided in the bottom of the downcomer and intended for the downward flow of liquid. In the other extreme, liquid droplets may be blown upward to the underside of the next higher tray. The liquid can then ascend through the column with the rising vapor, a problem referred to as entrainment. Entrainment also reduces the performance of the column.

The downcomers 2 on the subject tray are aligned parallel to one another and may be parallel to the downcomers in the vertically adjacent trays. However, the downcomers are preferably rotated at an angle such as 90 degrees from tray to tray to aid in admixture of the descending liquid and improve column performance. A further feature which may be discerned from FIG. 1 is that the liquid outlets 3 in the bottom of the downcomer are preferably grouped together such that the liquid falling from one downcomer is directed onto a decking area of the next lower tray rather than into a downcomer located below it. That is, if the downcomers of a lower tray are rotated 90 degrees from the downcomers of the next upper tray, then the grouped together liquid-sealable openings are placed in portions of the downcomers of the upper tray which are not immediately above the downcomers of the lower tray. The liquid descending from the upper tray will therefore not fall into the downcomers of the next lower tray but instead falls on the decking.

Figure 2:
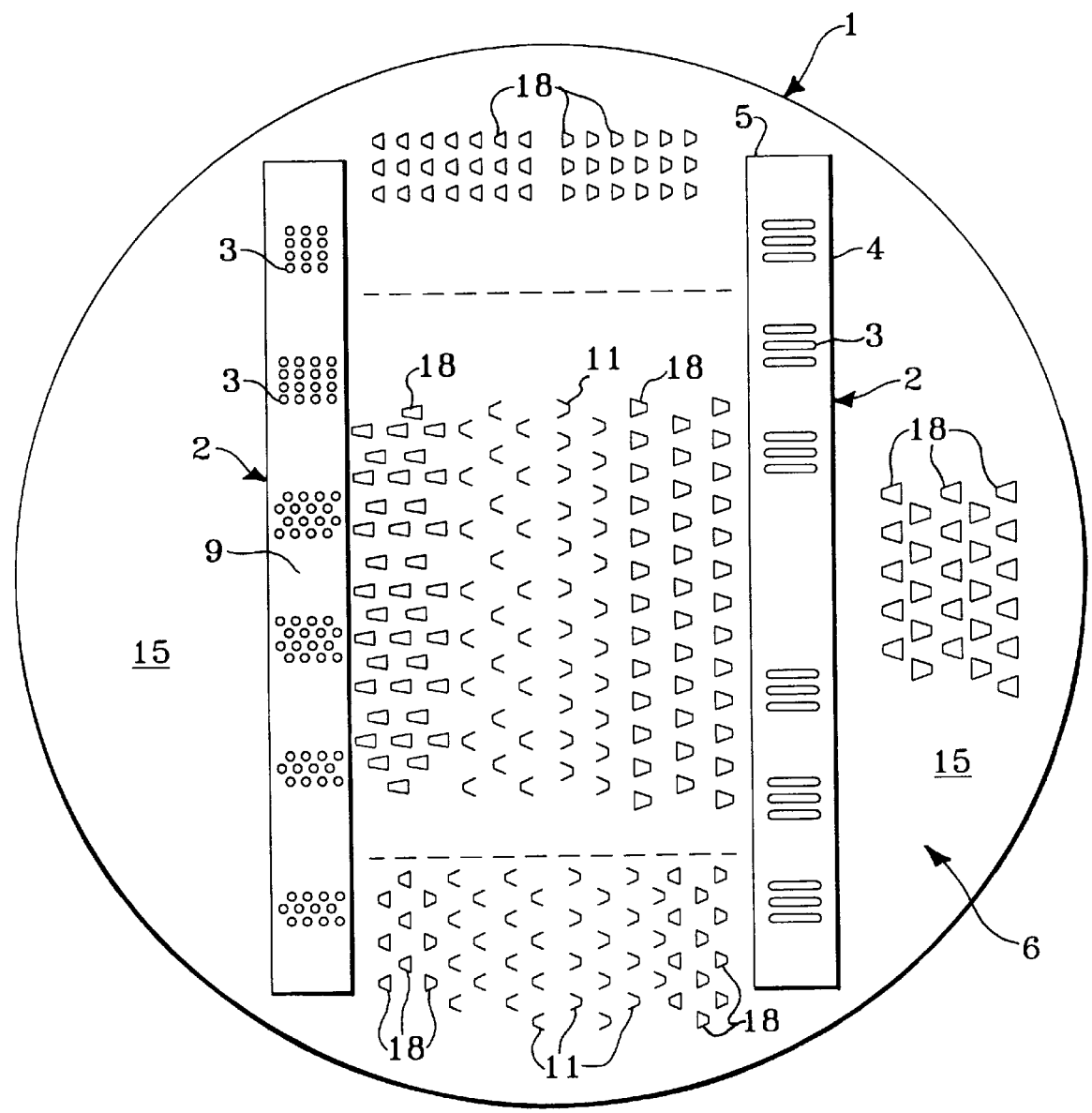
FIG. 2 is an overhead view of a tray 6 having two trough-like downcomers 2 separated by a decking section having representations of several different arrangements of single slot unidirectional and dual slot bidirectional vapor valves 11 and 18.

FIG. 2 presents another simplified overhead view of a fractionation tray according to the subject invention. The tray 6 of FIG. 2 comprises only two of the parallel trough-like downcomers 2. Again, each downcomer 2 is formed from two parallel vertical sidewalls 4 and two vertical endwalls 5. While a vertical alignment of the walls is preferred, this is not required and the walls may be at an angle from vertical such that the width of the downcomer varies from the top to the bottom. One difference from FIG. 1 is that FIG. 2 illustrates that the liquid outlets 3 in the bottom plate 9 or floor of the downcomer may take different forms such as a number of circular perforations instead of the elongated openings shown in FIG. 1.

Figure 6:
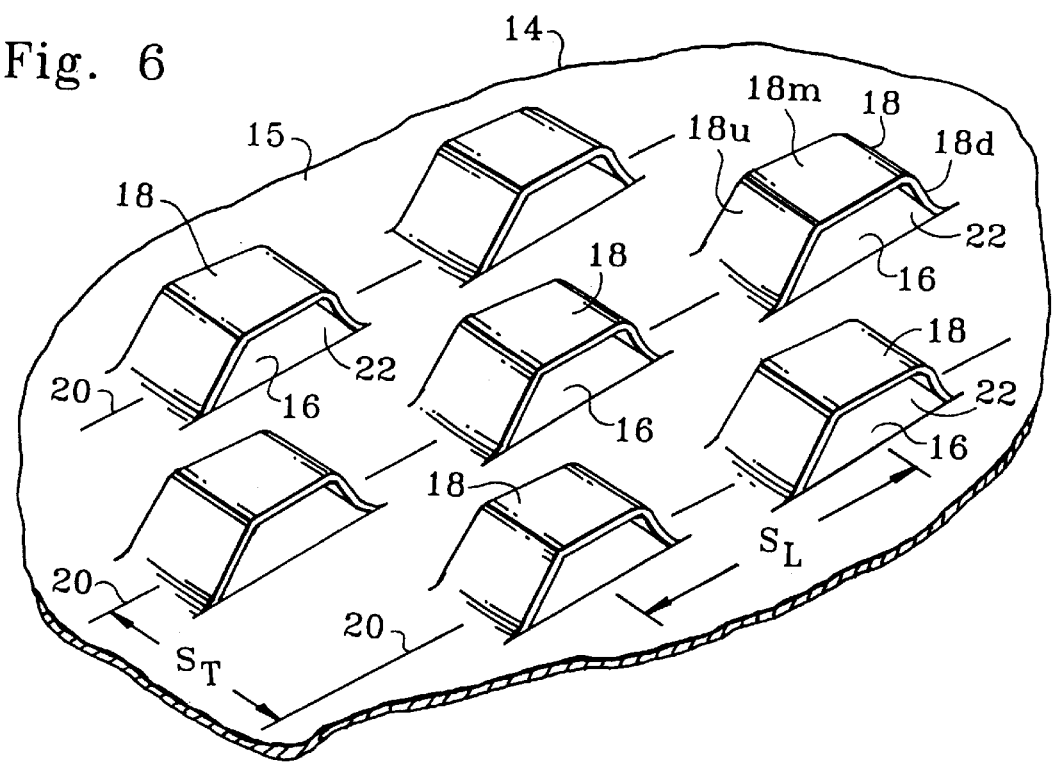
FIG. 6 is an isometric view of a portion of an active area of tray decking showing the shape of the trapezoidal bidirectional caps of the valves 18 used on the tray.

Other significant structured variations shown in FIG. 2 are different possible arrangements of the bidirectional valves 18 and the unidirectional valves 11 on the decking 15. Although these rigid structures are not able to close, the bidirectional structures 18 are often referred to in the industry as "stationary valves" or simply valves since they are intended to allow fluid flow in only one direction. The size of the drawing conflicts with making this presentation to scale. The valves 11 and 18 are therefore drawn larger than an accurate representation of comparitive size. In the top third of the decking between the downcomers, all of the trapezoidal-shaped caps of the bidirectional valves 18 are aligned to "face" the nearest downcomer. That is, the right-hand half of the valves 18 between the two downcomers 2 face the right-hand downcomer and the left-hand half of the valves 18 face the left-hand downcomer 2. The term "face" relates to the direction in which the smaller end of the trapezoid is pointed. A detailed view of a preferred valve layout in offset rows or lines perpendicular to the downcomers is shown in FIG. 6.

FIG. 2 also shows a different second arrangement of the valves 11 and 18 in the middle section of the tray between the dashed horizontal lines. The bidirectional valves in this instance face different directions as they are spread in staggered vertical lines across the decking 15. Further variation is illustrated by the five lines of valves 18 shown to the right of the rightmost downcomer 2. The vertical row of valves closest to this downcomer faces the downcomer and the next row of valves faces away from the downcomer. That is, their directions are rotated 180° on the decking 15.

This middle section of the figure also illustrates variations in how the valves may be laid out on the surface of the decking. The valves 18 on the right-hand portion of the tray are in vertical alignment but the individual valves are offset. The direction of the valves may also alternate in some sequence as shown in these five lines. These alternative arrangements of the valves may be used to effect changes in the direction of horizontal liquid movement on the tray and increase or decrease the retention time of the liquid on the tray. That is, the alignment of the valves 18 may be employed to facilitate or regulate the movement of the froth relative to the downcomers and affect the capacity and/or efficiency of the tray.

The valve arrangements shown between the downcomers in the middle and bottom thirds of the tray of FIG. 2 build upon this desire to affect and control the movement of the froth on the fractionation tray. These embodiments employ vapor passageways formed by two different cap-like structures. These two structures form the bidirectional valves 18 and the unidirectional valves 11. The slots are represented on the drawing by a figure having only three sides as the fourth side is formed by a very gradual bend or taper of the decking material. The short, middle, side has the single slot of these valves. The inidirectional valves, also referred to in the art as slots "face" the direction of the small opening in the central side of the valve. In the central portion of the decking between the downcomers 2, monodirectional vapor-directing valves 11 are provided and aligned such that the slots face the nearest downcomer. The froth formed in the central portion of the decking is in this way encouraged by the horizontal component of the gas rising through the slots to flow towards the nearest downcomer and thus quickly exit the tray. Near the downcomers the decking material contains the dual slot bidirectional valves 18 as these valves only impart a reduced horizontal impetus to the froth and do not strongly push it toward the downcomer. In this way, the froth is not blown over the inlet wall of the downcomers by the flow-directing slots and the need for a anti-jump baffle within the downcomer is reduced or eliminated. The use of an "anti-jump" baffle on a fractionation tray having similar trough-like downcomers is illustrated in the previously cited U.S. Pat. No. 5,332,390. This patent also illustrates the use of vapor-directing slots in the tray deck which are aligned in a direction towards the nearest downcomer to promote the flow of froth across the surface of the fractionation tray. The entire teaching of U.S. Pat. No. 5,382,390 in regard to the use and design of flow-directing slots for multiple downcomer fractionation trays and the design of downcomers is incorporated herein.

Figure 2A:
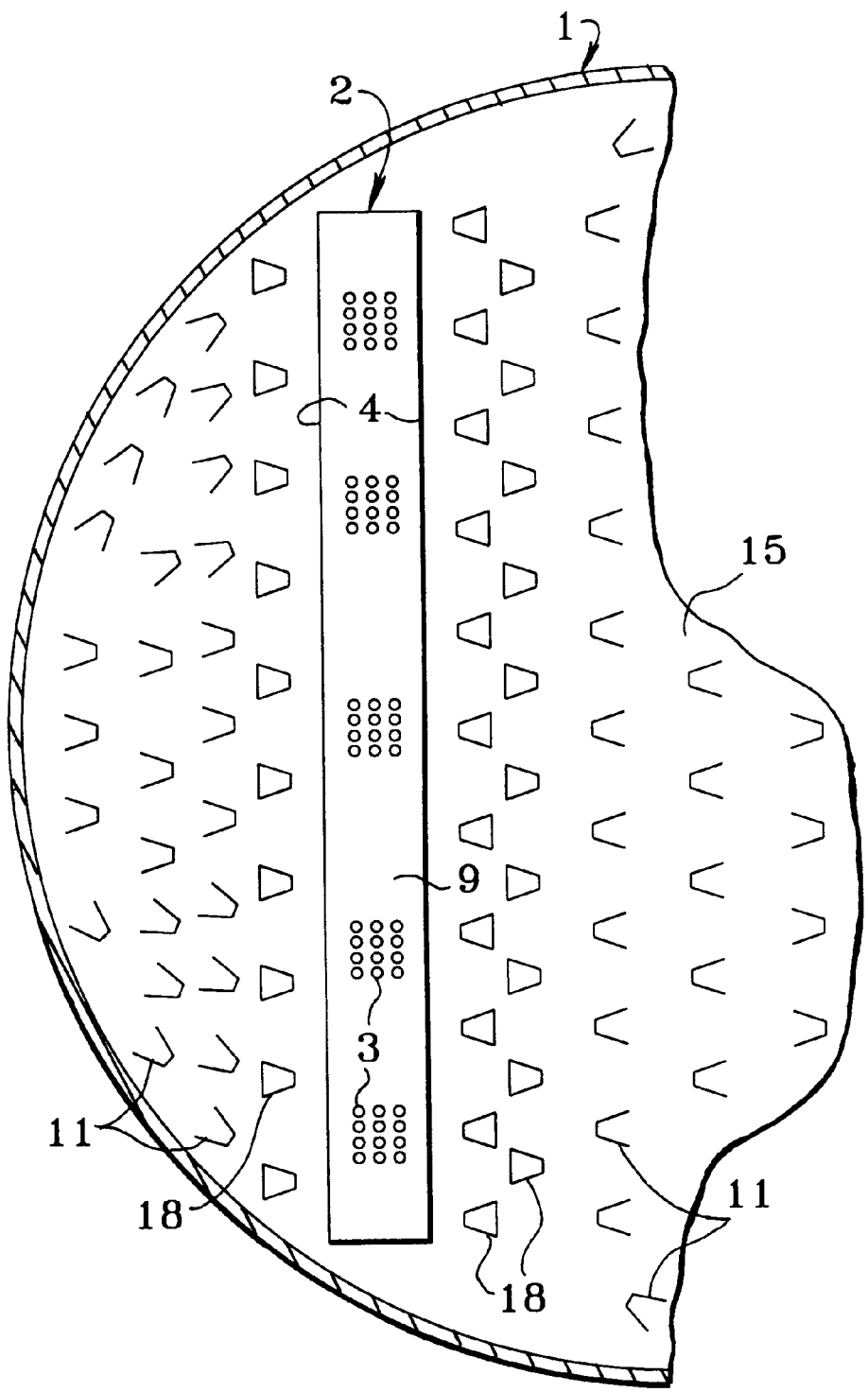
FIGS. 2A and 2B illustrate different arrangements of the flow-directing unidirectional slotted cap of valves 11 and bidirectional slotted cap of valves 18 on the left-hand portion of a two-downcomer tray, with the flow-directing valves 11 aligned to remove froth from otherwise stagnant areas at the edge of the tray.
Figure 2B:
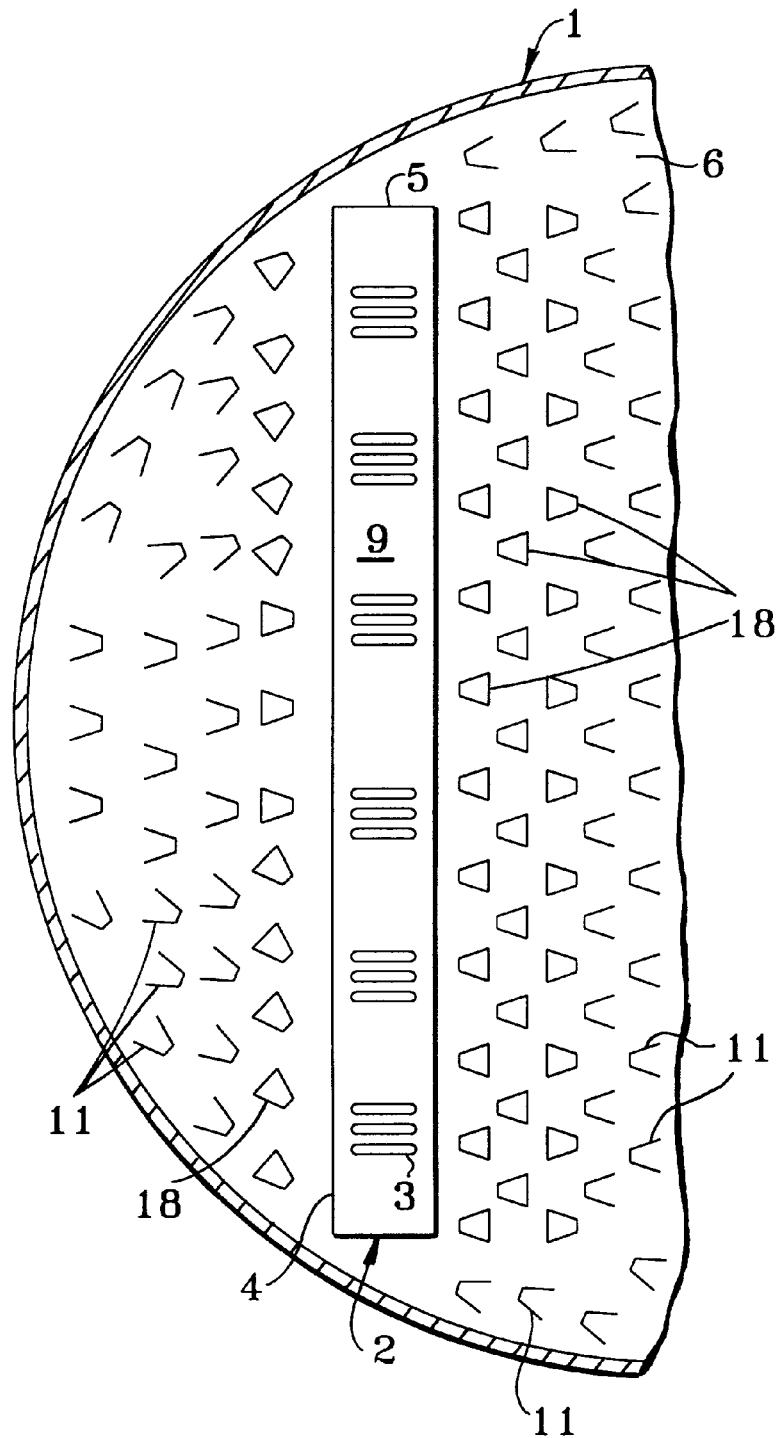

FIGS. 2A and 2B give a more complete depiction of some structural variations possible on the subject tray. These figures also show placement of the unidirectional vapor-flow directing valves 11 along the edge of the crescent-shaped section of the tray located between the downcomer 2 and the interior surface of the wall 1 of the column. The valves are capable of much more strongly pushing the froth and liquid on the tray than the bidirectional valves 18. This location and direction of the unidirectional valves is employed to eliminate stagnant areas on the tray surface which are not contributing to mass transfer.

The arrangement of the bidirectional valves 18 differ between FIGS. 2A and 2B. For instance, FIG. 2A shows the valves 18 which are located to the left of the downcomer as all facing the downcomer sidewall 4 while on FIG. 2B some of the valves diagonally face toward the end of the downcomer. FIG. 2A shows two vertical lines of valves 18 facing opposite directions on the right-hand side of the downcomer while FIG. 2B shows three lines, with the valves of two adjacent lines facing the downcomer 2.

Figure 3:
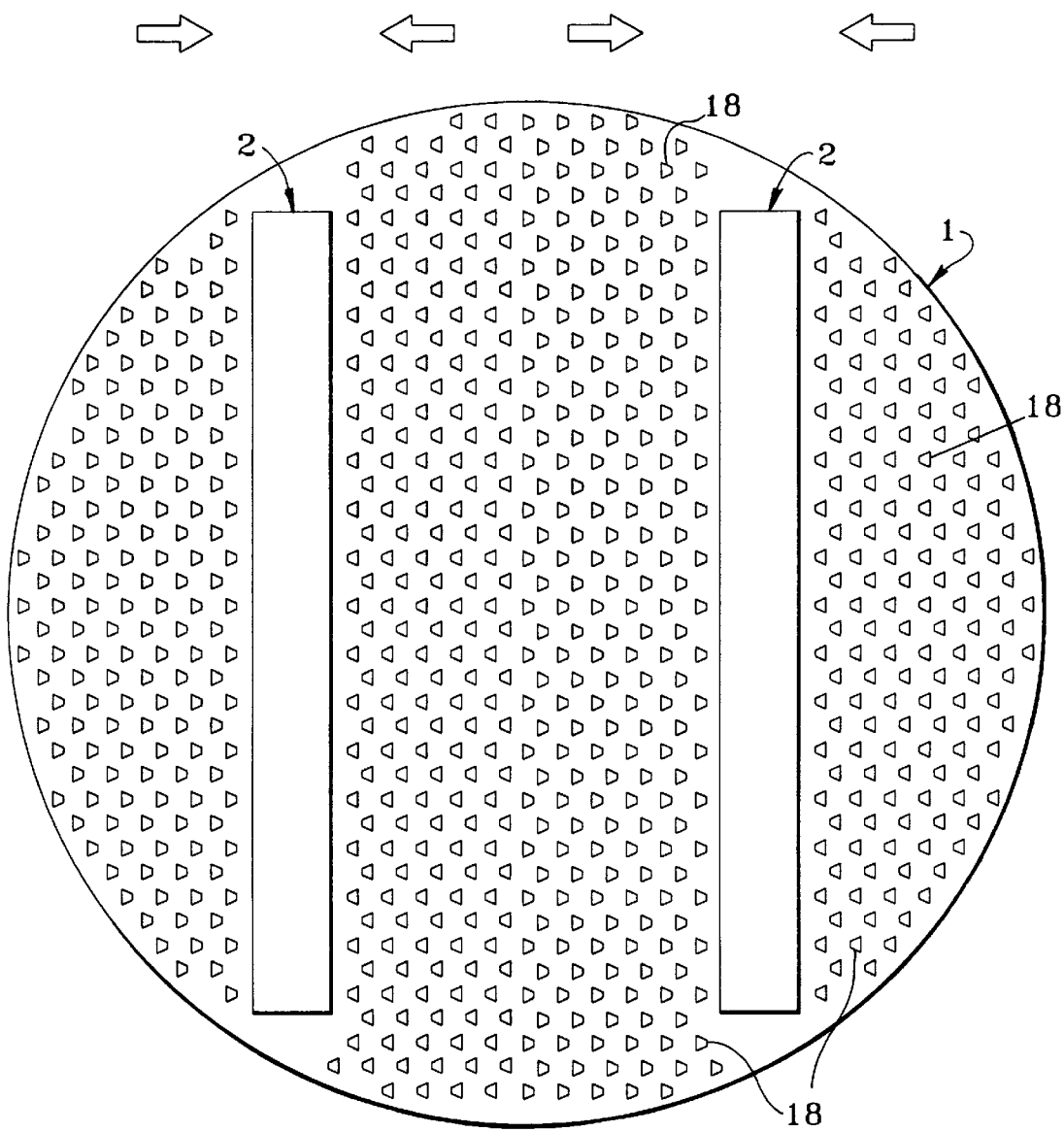
FIG. 3 is an overhead view of a tray similar to that of FIG. 2 but illustrating in greater detail a preferred arrangement, orientation and distribution of the trapezoidal caps of vapor valves 18 on the tray.

FIG. 3 provides a more detailed showing of the bidirectional valve arrangement similar to that shown in the top third of FIG. 2. It may be more clearly seen in this figure that the bidirectional valves 18 are pointed toward, that is, face the nearest downcomer 2, and that this arrangement of the valves 18 is present on all portions of the decking used in the tray. The caption above the Figure illustrates the intended direction of liquid flow on the decking towards the downcomers. This figure clearly illustrates a central rectangular area is present between the downcomers. The ends of this area are defined by a line through the endwalls of two adjacent downcomers.

Figure 4:
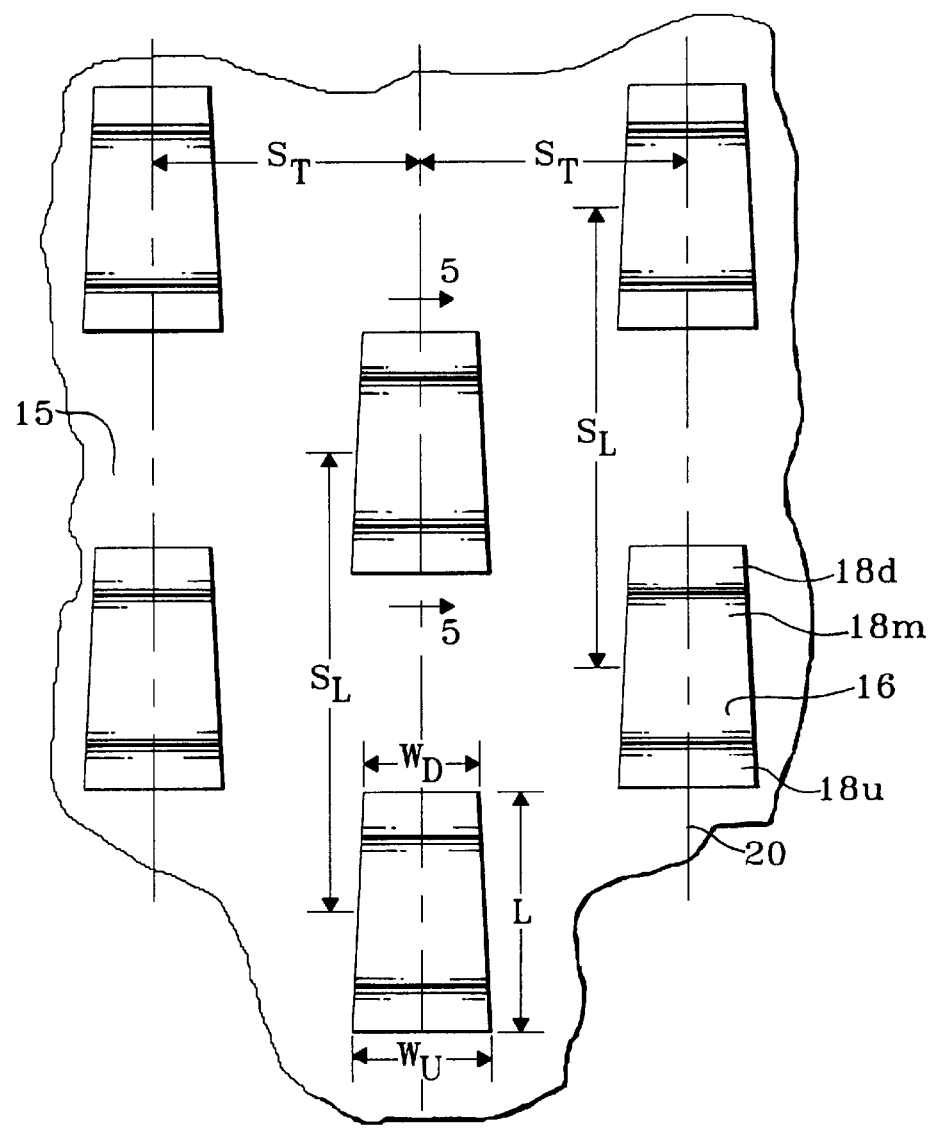
FIG. 4 is a diagram showing the preferred trapezoidal form of the raised metal caps of the valves 18, which project above the surface of the decking plate allowing vapor to exit through lateral openings and defining various measurements used in describing the arrangement of these valves.

FIG. 4 is a close-up diagram of the trapezoidal cap structure forming the valves 18 employed in all embodiments of the subject invention. These bidirectional valves 18 are spread in a defined pattern across the surface of the decking 15 to provide the active area of the tray. The layout or arrangement in this figure is similar to that of FIG. 3. The valves in adjacent lines are evenly spaced but the valves in different lines are slightly staggered such that the upstream and downstream portions 18$u$ and 18$d$ of adjacent trapezoidal caps overlap slightly. That is, the caps in each line are aligned head to toe and evenly spaced apart.

FIG. 4 defines the various measurements used to set out the size and spacing of these trapezoidal structures. The structures shown in FIG. 4 are actually the upward projection of a portion of the metal plate forming the decking 15 caused by a forming or embossing operation in a punch press. This operation results in a cutting of the metal on the two lateral sides of the valve 18. The larger upstream end portion 18$u$ and the smaller parallel downstream end portion 18$d$ of the cap are bent in this forming operation such that the cap extends above the remainder of the surface of the decking material and projects towards the upper direction in the column, thereby forming a tapezoidal cap over the hole in the surface of the tray. The width $W_D$ is the measurement of the portion of the trapezoid which forms the front of the valve. As used herein the term "face" is in reference to the shorter or downstream parallel side 18$d$ of the trapezoid. That is, the deflectors or valves shown in FIG. 4 face upward. The dimensions such as $S_T$ and $S_L$ given in FIG. 4 are for use in interpreting the following description of the spacing of the perforations.

Figure 5:
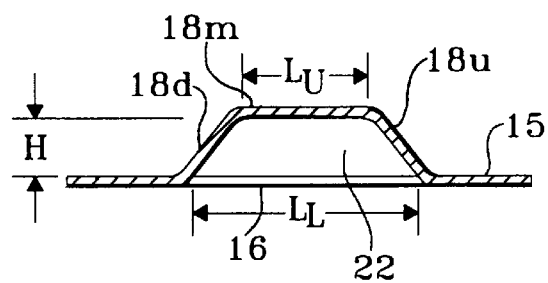
FIG. 5 is a sectional view along the plane indicated in FIG. 4 showing the overall shape of the bidirectional slotted cap of valve 18 punched into the decking material 15 to form a vapor passageway.

FIG. 5 is presented as an aid to understanding the structure of the trapezoidal caps of the valves 18. FIG. 5 shows a cross section of the decking 15 and bidirectional valve 18 taken along the centerline of one of the raised trapezoids 18 of FIG. 4. The punching and forming operation which creates the valve leaves a trapezoidal opening 22 in the decking 15. The forming (stretching) of the metal produces the inclined upstream leg or wall 18u which forms one end of the cap and the inclined downstream wall 18d of the other end. FIG. 5 also defines the measurements used in describing the length "L" and the height "H" of the valve 18.

FIG. 6 is a isometric view of a section of decking having several of the trapezoidal bidirectional vapor-directing structures used on the subject trays. The structure of the individual valves is the same as those in other figures and their arrangement is similar to that shown in FIG. 4. The three-dimensional nature of these contact-inducing means formed by the stretched and bent metal forming the valve 18 is easily seen in this Figure. The cap forms a roof over the opening in the decking 15 such that liquid cannot fall directly into the opening. This cap projects "above" the tray, as defined for purposes of this description by the upper surface of the decking 15. The vapor emerging through the perforation 22 in the valve 18 prevents the entrance of liquid into the openings on two sides of the valve 18. By this valving function it is possible to maintain a shallow layer of liquid-containing froth upon the surface of the fractionation tray despite the presence of many perforations through the tray.

FIG. 6 illustrates a layout of the contact-inducing valves in a pattern similar to that shown in FIG. 4. This arrangement or layout consists of offset lines laying along the centerline 20 of the valves 18. While portions of the deflectors overlap, the arrangement of the valves in this Figure is such that vapor emerging from the center line of valves is not directed at the corresponding vapor outlet of the neighboring valves. That is, the vapor outlet slots or apertures 16 of adjacent lines of valves 18 do not face directly into one another. This arrangement is preferred for use when all of the bidirectional valves 18 are aligned or face in the same direction. Previously cited U.S. Pat. Nos. 5,360,583 and 5,468,425 are incorporated herein for their teaching on the structure and arrangement of the bidirectional valves 18, the use of these valves and the structure of trays employing these valves.

The previously referred to U.S. Pat. No. 5,360,583 describes the valves 18 in some detail. This reference specifies that the length (L) of the valves should be no longer than 2.0 inches and that the height (H) should be no greater than 0.35 inches. The dimensions of a preferred embodiment of that patent are given in a table as a height of 0.313 inches and a lower length of 1.313 inches. In contrast, a preferred embodiment of the subject invention uses a similar structure having a height of less than 0.23 inches and a length at the base of the valve of less than 1.0 inch. These smaller-sized bidirectional vapor caps were found to give unexpected different and improved performance when used as part of a multiple downcomer tray. The larger valves described in the cited reference did not provide the improved performance or allow the reduction in vertical tray spacing described below.

The structure of each bidirectional valve includes a trapezoidal cap which overlies an aperture in the decking material having a longitudinal axis which is parallel to the normal liquid flow direction, and is tapered from a maximum dimension, transverse to the flow direction, at its upstream end to a minimum dimension transverse to the flow direction at its downstream end. Each cap includes an upstream end portion, a central portion, and a downstream end portion. Each upstream portion extends above the deck at an upstream end of the associated aperture, and it lies across the entire maximum transverse extent of the aperture so that the entirety of the aperture is shielded from liquid which is moving toward the aperture. Each downstream portion extends above the deck at the downstream end of its aperture, and it lies across the entire transverse extent of the downstream end of the aperture to prevent vapors from impelling liquid in a downstream direction. Each cap and the adjacent deck define two lateral outlet slots 16 which are oriented to direct vapor which passes up through the aperture in directions which are generally transverse to the normal flow direction of liquid on the deck. This direction is along the centerline 20 shown in FIG. 6. The orientation and location of the valves relative to the downcomers will of course set the actual direction of liquid flow. The centers of the valves 18 are preferably spaced apart no more than about 3.0 inches longitudinally of the flow direction, and no more than about 2.0 inches transversely of the flow direction.

Figure 7:
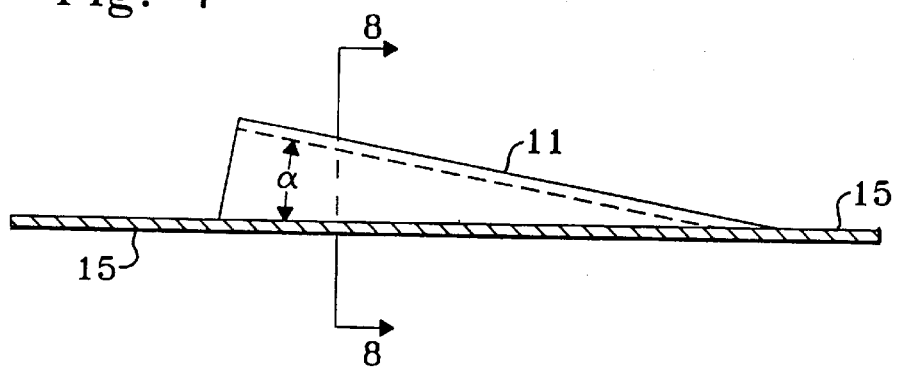
FIG. 7 is a side view of a portion of the decking 15 showing the profile of the vapor-directing unidirectional slotted cap of valve 11 used in some embodiments of the invention.
Figure 8:
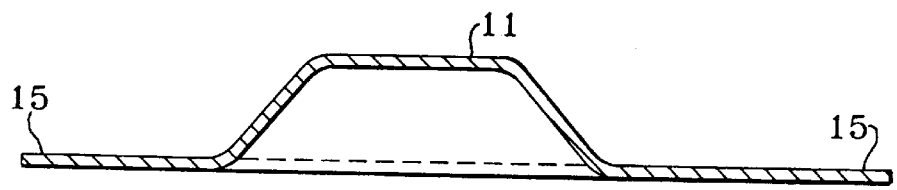
FIG. 8 is the view seen looking into the opening of a unidirectional slotted cap of vapor-directing valve 11 of FIG. 7.

FIG. 7 is an oversized sideview of a monodirectional vapor-directing valve 11. This type of valve is also preferably formed by a metal-forming operation. This operation cuts only one slot in the metal. This forms a single perforation for the upward escape of vapor while also forming a gently inclined ramp having an angle "a" from the horizontal decking 15 of the tray. This results in a wedge-shaped or ski jump-like inclined vapor-directing slot from which vapor exits in only one direction. The exiting vapor will have a significant horizontal directional component which will impart horizontal energy to the liquid and froth on the tray. FIG. 8 is a cross-sectional view of the flow-directing slot 11 of FIG. 7. The view of FIG. 8 is taken looking from the opening into the back of the slot.

Figure 9:
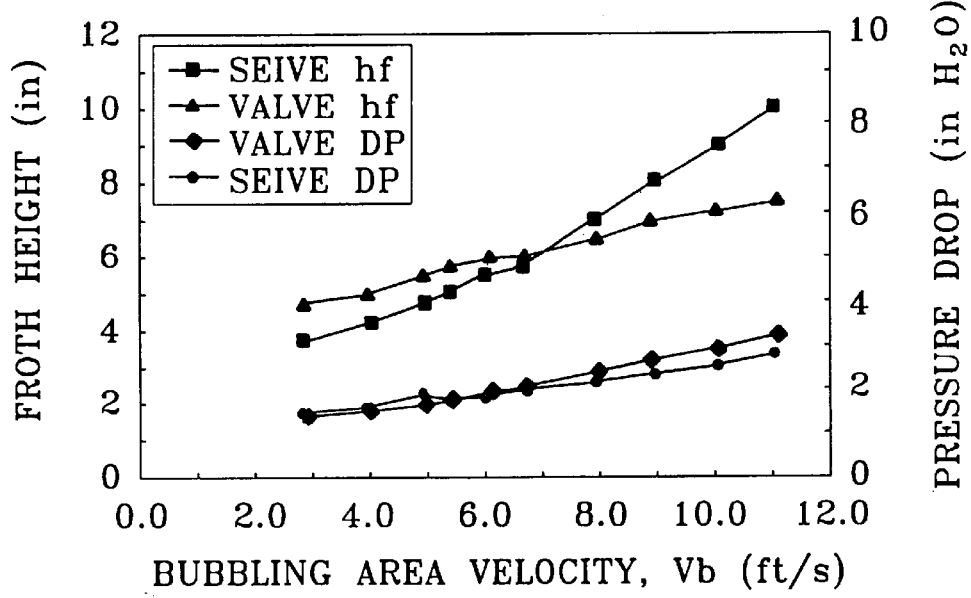
FIGS. 9 and 10 illustrate pressure drop and froth height having circular (sieve) openings and the subject trapezoidal bidirectional valves.
Figure 10:
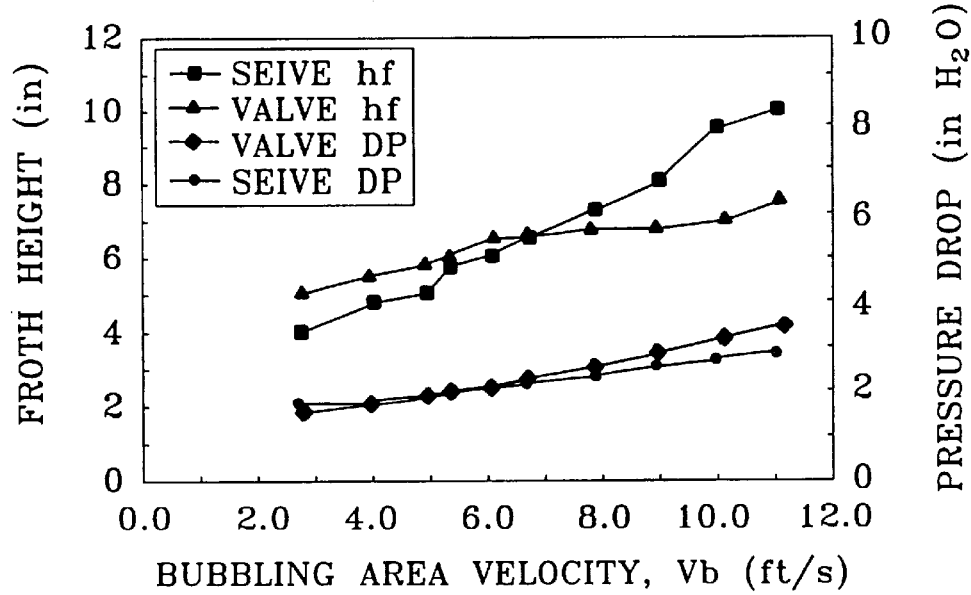

FIGS. 9 and 10 are graphical comparisons of the pressure drops (DP) and froth heights (hf) observed on similarly-designed trays of the invention and comparative multiple downcomer trays having sieve decks examined in a test apparatus operated at liquid rates corresponding to 0.0668 ft$^3$/s.ft weir and 0.1003 ft$^3$/s.ft weir, respectively, and various vapor rates. As depicted on both Figures, the froth height of the valve-equipped tray became lower than the froth height of the sieve-equipped tray at medium vapor rates. The slope of the froth height line for the subject tray is less than that of the sieve tray froth height line. This results in lower froth heights at higher vapor rates. This phenomenon of the crossing froth heights is nonobvious and may be attributed to the unique employment of valve decks on multiple downcomer trays as addressed in the embodiments of the subject invent-on.

Actual full scale testing of the subject tray system has shown it provides several advantages over conventional multiple downcomer trays employing circular or "sieve" type vapor perforations. While the testing was performed using an air-water simulation for safety and environmental reasons, this type of testing has been proven to be highly accurate in predicting the performance of common hydrocarbon systems. This testing has shown replacement of sieve decking with a unidirectional arrangement of the preferred valves resulted in the ability to operate efficiently at vapor capacities which were both higher and lower than sieve-type decking. This increased the "rangeability" of the tray to 50–120 percent of design as compared to sieve decks, which typically only allowed operation at 70–110 percent of the same design capacity.

The advantage seen in the allowable turndown of the trays is especially important since the turndown ability of multiple downcomer trays decreases as tray spacing is reduced. Turndown is the ability to reduce the operating rate in the column, measured by vapor rate, and is useful in allowing flexible operation of the column and associated process units. For instance, with a 24-inch tray spacing, the maximum allowable turndown was typically about 50 percent. The practical turndown decreased to about 70 percent at a 12-inch tray spacing. With a simple replacement of the sieve decking with a unidirectional arrangement of the preferred valves 18, the maximum practical turndown increases to 30 percent at 24-inch tray spacing and 50 percent at a 12-inch tray spacing.

An optional mechanical device which may be employed on the subject apparatus is a disengagement plate or "anti-jump" baffle. This plate is employed on several multiple downcomer tray designs. The plate is mounted vertically above the center of a downcomer inlet. It preferably runs the length of the downcomer and extends upward from the downcomer inlet toward the tray above. It may rise to a height close to the bottom of the decking of this next higher tray, with the upper edge of the plate being castellated to accommodate the crossing downcomers of the next higher tray. The use of this baffle is not preferred.

Preferably only the relatively small bidirectional vapor valves 18 and unidirectional slotted valves 11 are used in the subject trays. The trays are therefore preferably free of any significant amount of other vapor openings including the traditional round openings through the decking used on sieve trays.

The downcomers on a particular tray may be oriented perpendicular to those on the vertically adjacent trays or they may be rotated in other directions. A perpendicular, or at least partially rotated arrangement, is considered optimal but may be departed from if desired. That is, the downcomer channels on vertically adjacent trays may run in the same direction, or may be arranged transversely. The vertical generally cylindrical outer vessel 1 will contain a sizeable number of vertically spaced apart trays. A commercial column will contain from 10 to about 150 of these fractionation trays located at uniform intervals. The vertical spacing between the trays is preferably equal to about 2–5 times the height of the downcomers.

While not illustrated on the figures, all embodiments of the invention may include an optional bed of packing located in the cylindrical open volume of the column beneath the tray deck. That is, the tray may be modified by the addition of packing below the decking and/or below the downcomer outlets if desired. The addition of a properly designed and wetted bed of packing below a tray has been found to provide a system having an increased overall efficiency compared to using just the tray decking for vapor-liquid contact. Perforations in the lower portion of the downcomers may be employed as a means to spread liquid onto the packing bed(s). Each bed preferably has a thickness, measured top to bottom, greater than the depth of a downcomer, but less than the distance between trays. The beds preferably fill 20–70% of the volume between the lowermost point of a downcomer module and the top point of the next lower tray. If the subject apparatus is employed for catalytic distillation, the packing may include catalyst.

As the apparatus may contain packing, it is appropriate to note a fundamental difference between fractionation trays and packing distributors: trays "froth" whereas distributors "rain". That is, fractionation trays form a froth on their upper surface to promote mass transfer between the vapor and liquid phases. Distributors collect and separate the phases before allowing the liquid to fall in a desired pattern.

The optional packing beds may contain random packings; e.g., rings, spheres, saddles, structured or ordered bed packings; e.g., corrugated, rolled, screens or plates. Examples of random and structured packings are provided in U.S. Pat. Nos. 5,200,119 and 5,132,056 which are incorporated herein for their teaching as to the nature and use of such packing. A preferred packing material is described in U.S. Pat. No. 4,576,763.

The amount of packing used with any one tray is preferably equal in volume to less than 50 percent of the open volume of the column between the upper and lower trays of the pertinent tray pair enclosing the packing. The packing bed of the subject invention preferably extends downward to within 8 centimeters of the intended upper surface of the froth on the next lower tray. The bottom of the packing is therefore well above the top of the next tray. A minimum vertical bed thickness of 10 cm is desired, with beds up to 150 cm thick being contemplated.

One embodiment of the invention may be characterized as a fractionation tray adapted for being mounted in a horizontal plane in a vertical fractionation column, said tray having upper and lower surfaces and comprising a plurality of trough-like downcomers, with each downcomer comprising a pair of planar sidewalls, said downcomers having a lower region provided with liquid sealable openings for the downward liquid flow in the column; a plurality of substantially planar decking plates located between said downcomers with the decking plates having perforations suitable for the upward passage of the entire upward vapor flow in the column, with at least a major portion of these perforations being formed in the decking plates by a pressing operation which forms a trapezoid raised above the upper surface of the tray and defined by two opposing slotted sides and two ends with one end of the trapezoid being narrower than the other end, with the trapezoid substantially covering the opening formed by the pressing operation, and the decking plates being further characterized by at least a plurality of the trapezoids being arranged in lines parallel to the downcomer sidewalls, with the trapezoids in one line having the narrower end facing 180 degrees from the direction faced by the narrower end of the trapezoid in an adjacent line of trapezoids which is located closer to or further away from a particular downcomer.

An alternative embodiment of the invention may be characterized as a tray adapted for being mounted in a horizontal plane in a vertical fractionation column, said tray having upper and lower surfaces and comprising a plurality of trough-like downcomers, with each downcomer comprising a pair of planar sidewalls which are inclined at substantially equal angles from the plane of the tray and joined to a bottom plate having liquid sealable openings for the entire downward liquid flow in the column and located in a bottom region of the downcomer; a plurality of substantially planar decking areas located between said downcomers, with the decking areas having two different types of perforations which together accommodate the upward passage of the entire upward vapor flow in the column, with a first type of the perforations being formed in the decking material by a pressing operation which forms an isosceles trapezoid raised above the upper surface of the tray and defined by two longer sides and two bent portions of decking plate material at the parallel ends of the trapezoid, with the trapezoid substantially covering the opening formed by the pressing operation, and with each longer side of the trapezoid having a horizontally facing vapor outlet slot; a second type of the perforations being in the form of a structure projecting above the upper surface of the tray as a unidirectional slotted cap, said cap having a single vapor outlet slot on one horizontal face; and, with the tray being further characterized by the location of the respective types of perforations in a pattern in which perforations of the first type are located in a part of the decking area which is adjacent a downcomer and perforations of the second type are located on a central portion of the decking area separated from the downcomers by the first type of perforations.

The subject apparatus can be used in a variety of gas-liquid contacting operations besides fractional distillation including absorption and gas treating for impurity removal. In each of these processes, gas rises upward through the trays and the retained froth while liquid passes downwardly through the downcomer structures and emerges therefrom as droplets which fall onto the next lower tray or packing.

One broad embodiment of the invention may accordingly be characterized as a fractionation tray adapted for being mounted in a horizontal plane in a vertical fractionation column, said tray having upper and lower surfaces and comprising a plurality of trough-like downcomers, with each downcomer comprising a pair of planar sidewalls joined to a bottom plate having liquid sealable openings located therein; substantially planar decking plates occupying substantially all of the remainder of the tray's surface including a rectangular area located between said downcomers, with the decking plates of the tray having perforations suitable for the upward passage of the entire upward vapor flow in the column, with at least a major portion of these perforations being formed in the decking plates by a pressing operation which forms bidirectional slotted caps raised above the planar upper surface of the decking plates and defined by two parallel slots in the longer sides of a trapezoid portion of the decking plate material, with the trapezoid substantially covering an opening formed by the pressing operation, and the decking plates being further characterized by the orientation of these perforations in a pattern in which groups of the perforations face in opposite directions, with some perforations facing the nearest downcomer.

These embodiments can also comprise separate pluralities of the monodirectional slotted caps (valves) facing the closest of the two bordering downcomers and located in a central portion of the rectangular area. These slots are preferably centered between the downcomers. The apparatus according to the present invention can be used in the form of a new apparatus or as a modification to an existing apparatus. That is, an existing trayed column may be modified to employ the subject invention.

We claim:

1. A fractionation tray adapted for being mounted in a horizontal plane in a vertical fractionation column, said tray having upper and lower surfaces and comprising:
   a) a plurality of trough-shaped downcomers, with each downcomer comprising a pair of sidewalls, each of said downcomers having liquid sealable openings located in a lower region thereof; and,
   b) substantially planar decking plates occupying the remainder of the tray surface including a rectangular area located between said downcomers, with the decking plates of the tray having perforations suitable for the upward passage of the entire upward vapor flow in the column, with at least a major portion of these perforations being formed in the decking plates of the tray by a pressing operation which forms bidirectional slotted caps raised above the planar upper surface of the decking plates, each of said bidirectional slotted caps being a trapezoid portion of the decking plate material having two sides and two ends, one end being narrower than the other end, with said trapezoid portion substantially covering an opening formed by the pressing operation to provide oppositely directed vapor outlet slots at the sides thereof, and with the decking plates being further characterized by the orientation of bidirectional slotted caps in a pattern in which groups of the bidirectional slotted caps face in opposite directions.

2. The fractionation tray of claim 1 further characterized in that the bidirectional slotted caps located between downcomers face the nearest downcomer.

3. The fractionation tray of claim 1 further comprising a plurality of monodirectional slotted caps located in a central portion of said rectangular area, the monodirectional slotted caps being centered between two bordering downcomers and separated from the downcomers by said bidirectional slotted caps.

4. The fractionation tray of claim 3 wherein a separate plurality of the monodirectional slotted caps faces each of the two bordering downcomers.

5. A fractionation tray adapted for being mounted in a horizontal plane in a vertical fractionation column, said tray having upper and lower surfaces and comprising:
   a) a plurality of trough-shaped downcomers, with each downcomer comprising a pair of planar sidewalls, said downcomers having a lower region provided with liquid sealable openings for the downward liquid flow in the column;
   b) a plurality of substantially planar decking plates located between said downcomers with the decking plates having perforations suitable for the upward passage of the entire upward vapor flow in the column, with at least a major portion of these perforations being formed in the decking plates by a pressing operation which forms a trapezoid raised above the upper surface of the tray and defined by two opposing slotted sides and two ends with one end of the trapezoid being narrower than the other end, with the trapezoid substantially covering the opening formed by the pressing operation, and the decking plates being further characterized by at least a plurality of the trapezoids being arranged in lines parallel to the downcomer sidewalls, with the trapezoids in one line having the narrower end facing 180 degrees from the direction faced by the narrower end of the trapezoid in an adjacent line of trapezoids which is located closer to or further away from a particular downcomer.

6. A fractionation tray adapted for being mounted in a horizontal plane in a vertical fractionation column, said tray having upper and lower surfaces and comprising:
   a) a plurality of trough-shaped downcomers, with each downcomer comprising a pair of planar sidewalls which are inclined at substantially equal angles from the plane of the tray and joined to a bottom plate having liquid sealable openings for the entire downward liquid flow in the column and located in a bottom region of the downcomer;
   b) a plurality of substantially planar decking areas located between said downcomers, with the decking areas having two different types of perforations which together accommodate the upward passage of the entire upward vapor flow in the column, with
      i) a first type of the perforations being formed in the decking material by a pressing operation which forms an isosceles trapezoid raised above the upper surface of the tray and defined by two longer sides and two bent portions of decking plate material at the parallel ends of the trapezoid, with the trapezoid substantially covering the opening formed by the pressing operation, and with each longer side of the trapezoid having a horizontally facing vapor outlet slot;

ii) a second type of the perforations being in the form of a structure projecting above the upper surface of the tray as a unidirectional slotted cap, said cap having a single vapor outlet slot on one horizontal face; and, iii) with the tray being further characterized by the location of the respective types of perforations in a pattern in which perforations of the first type are located in a part of the decking area which is adjacent a downcomer and perforations of the second type are located on a central portion of the decking area separated from the downcomers by the first type of perforations.

7. A gas-liquid contacting apparatus comprising a plurality of the trays of claim 6 spaced vertically apart at uniform distances within a cylindrical outer vessel.

* * * * *